(12) United States Patent
Nishiyama

(10) Patent No.: US 11,548,598 B2
(45) Date of Patent: Jan. 10, 2023

(54) IMAGE GENERATING DEVICE AND METHOD OF GENERATING IMAGE

(71) Applicant: Furuno Electric Co., Ltd., Nishinomiya (JP)

(72) Inventor: Koji Nishiyama, Nishinomiya (JP)

(73) Assignee: Furuno Electric Co., Ltd., Nishinomiya (JP)

(*) Notice: Subject to any disclaimer, the term of this patent is extended or adjusted under 35 U.S.C. 154(b) by 272 days.

(21) Appl. No.: 16/970,306

(22) PCT Filed: Nov. 27, 2018

(86) PCT No.: PCT/JP2018/043460
§ 371 (c)(1),
(2) Date: Aug. 14, 2020

(87) PCT Pub. No.: WO2019/130940
PCT Pub. Date: Jul. 4, 2019

(65) Prior Publication Data
US 2021/0009240 A1 Jan. 14, 2021

(30) Foreign Application Priority Data
Dec. 25, 2017 (JP) ............................. JP2017-247674

(51) Int. Cl.
*B63B 49/00* (2006.01)
*B63B 79/40* (2020.01)
(Continued)

(52) U.S. Cl.
CPC .............. *B63B 49/00* (2013.01); *B63B 79/10* (2020.01); *B63B 79/40* (2020.01); *G01C 21/203* (2013.01);
(Continued)

(58) Field of Classification Search
CPC .. G01C 21/20; G01C 21/203; G01C 21/5691; G01C 21/3694; G01C 21/38;
(Continued)

(56) References Cited

U.S. PATENT DOCUMENTS 6,181,302 B1   1/2001 Lynde
8,296,001 B1   10/2012 Kabel et al.
(Continued)

FOREIGN PATENT DOCUMENTS

CN   103975576 A   8/2014
CN   106814735 A   6/2017
(Continued)

OTHER PUBLICATIONS

V. Fernandez Arguedas, G. Pallotta and M. Vespe, "Maritime Traffic Networks: From Historical Positioning Data to Unsupervised Maritime Traffic Monitoring," in IEEE Transactions on Intelligent Transportation Systems, vol. 19, No. 3, pp. 722-732, Mar. 2018, doi: 10.1109/TITS.2017.2699635. (Year: 2018).*
(Continued)

*Primary Examiner* — Cuong H Nguyen
(74) *Attorney, Agent, or Firm* — Alleman Hall Creasman & Tuttle LLP

(57) ABSTRACT

The purpose is to provide an image generating device which generates a synthesized image from which one is able to intuitively grasp a relation between an image and a traveling position of a water-surface movable body. The image generating device includes processing circuitry. The processing circuitry acquires attitude information indicative of an attitude of a camera or a ship where the camera is installed. The processing circuitry acquires a traveling route of the ship based on a detection result of at least one of a position and a direction of the ship. The processing circuitry generates traveling route display data based on the attitude information
(Continued)

and the traveling route. The processing circuitry generates a synthesized image in which the traveling route display data is synthesized with an image outputted from the camera.

20 Claims, 9 Drawing Sheets

(51) Int. Cl.
*B63B 79/10* (2020.01)
*G01C 21/20* (2006.01)
*G01S 19/53* (2010.01)
*H04N 5/265* (2006.01)
*H04N 7/18* (2006.01)

(52) U.S. Cl.
CPC ............ *G01S 19/53* (2013.01); *H04N 5/265* (2013.01); *H04N 7/183* (2013.01); *B63B 2213/00* (2013.01); *G01C 21/20* (2013.01); *G01S 2201/08* (2019.08)

(58) Field of Classification Search
CPC ..... B63B 22/16; B63B 51/00; B63B 2213/02; G01S 19/53; G01S 2201/08
USPC .................................................. 701/21, 467
See application file for complete search history.

(56) References Cited

U.S. PATENT DOCUMENTS

| | | | |
|---|---|---|---|
| 9,274,595 B2* | 3/2016 | Reitan | G06T 19/006 |
| 9,401,049 B2* | 7/2016 | Kim | G06T 11/00 |
| 10,077,983 B2* | 9/2018 | Okuda | G01C 21/20 |
| 11,270,458 B2* | 3/2022 | Nishiyama | G06T 19/006 |
| 11,270,512 B2* | 3/2022 | Nishiyama | H04N 5/23238 |
| 2002/0007237 A1* | 1/2002 | Phung | G05B 23/0275 |
| | | | 709/219 |
| 2009/0271054 A1* | 10/2009 | Dokken | G01S 13/862 |
| | | | 701/21 |
| 2010/0253542 A1* | 10/2010 | Seder | G01S 13/931 |
| | | | 340/425.5 |
| 2011/0153151 A1* | 6/2011 | Rogers | G07C 5/008 |
| | | | 701/31.4 |
| 2012/0226437 A1 | 9/2012 | Li et al. | |
| 2014/0160165 A1* | 6/2014 | Kim | G01C 21/005 |
| | | | 345/633 |
| 2014/0253597 A1 | 9/2014 | Dohi et al. | |
| 2015/0330803 A1* | 11/2015 | Okuda | G01C 21/20 |
| | | | 701/538 |
| 2015/0350552 A1 | 12/2015 | Pryszo et al. | |
| 2016/0214534 A1 | 7/2016 | Richards et al. | |

FOREIGN PATENT DOCUMENTS

| | | |
|---|---|---|
| JP | H06301897 A | 10/1994 |
| JP | H09229710 A | 9/1997 |
| JP | 2010003274 A | 1/2010 |
| JP | 2014529322 A | 11/2014 |
| JP | 2015215532 A | 12/2015 |
| KR | 101072395 B1 | 10/2011 |
| WO | 2012127189 A1 | 9/2012 |
| WO | 2013012277 A2 | 1/2013 |
| WO | 2013012280 A2 | 1/2013 |
| WO | 2017208422 A1 | 12/2017 |

OTHER PUBLICATIONS

T. Yang, H. Liang, N. Cheng, R. Deng and X. Shen, "Efficient Scheduling for Video Transmissions in Maritime Wireless Communication Networks," in IEEE Transactions on Vehicular Technology, vol. 64, No. 9, pp. 4215-4229, Sep. 2015, doi: 10.1109/TVT.2014.2361120. (Year: 2015).*
D. Perez et al., "Solving the Physical Traveling Salesman Problem: Tree Search and Macro Actions," in IEEE Transactions on Computational Intelligence and AI in Games, vol. 6, No. 1, pp. 31-45, Mar. 2014, doi: 10.1109/TCIAIG.2013.2263884. (Year: 2014 ).*
W. Elleuch, A. Wali and A. M. Alimi, "Mining road map from big database of GPS data," 2014 14th International Conference on Hybrid Intelligent Systems, 2014, pp. 193-198, doi: 10.1109/HIS.2014.7086197. (Year: 2014).*
European Patent Office, Extended European Search Report Issued in Application No. 18894221.3, dated Apr. 1, 2021, Germany, 10 pages.
Vlaming, A. et al., "Augmented reality used in navigation. Project 2 Theme: Improvement and innovation content," Proceedings of Maritime Symposium Rotterdam, Feb. 5, 2013, Rotterdam, Netherlands, 25 pages.

* cited by examiner

IMAGE GENERATING DEVICE AND METHOD OF GENERATING IMAGE

CROSS REFERENCE TO RELATED APPLICATIONS

This application is a U.S. National stage of International Application No. PCT/JP2018/043460 filed on Nov. 27, 2018 which in turn claims priority to Japanese Patent Application No. 2017-247674 filed on Dec. 25, 2017, the entire disclosure of each of which is hereby incorporated herein by reference for all purposes.

TECHNICAL FIELD

The present disclosure mainly relates to an image generating device which generates an image which indicates a situation around a water-surface movable body.

BACKGROUND

This kind of the image generating device is disclosed, for example, in Patent Document 1. This image generating device of Patent Document 1 includes a camera, an imaging data receiving part, a position acquiring part, an image generating part, a target object display item generating part, and a display unit. The image generating device is configured to perform georeferencing of an image stream from the camera.

In Patent Document 1, the imaging data receiving part receives stream image data imaged by the camera of a ship. The position acquiring part acquires the position of a target object around the ship (another ship etc.). The image generating part generates an image to be displayed on the display unit based on an image of the stream image data. The image corresponds to the position and the field of view of the camera. The target object display item generating part generates a target object display item indicative of the target object at a point in the image. Then, the image, and the target object display item disposed at the point in the image are displayed on the display unit.

The image generating part described above generates the image by projecting the image on a three-dimensional virtual space indicative of the environment around the water-surface movable body, in which points correspond to the points in the image, respectively. Further, the target object display item generating part described above generates the target object display item based on positional information on the target object, and each of the points of the three-dimensional virtual space.

REFERENCE DOCUMENT OF CONVENTIONAL ART

Patent Document

Patent Document 1 US2015/0350552A1

DESCRIPTION OF THE DISCLOSURE

Problem to be Solved by the Disclosure

However, although Patent Document 1 discloses a method of projecting the target object display item on the image, it does not disclose a method of intuitively grasping a relation between the image and a traveling position of the water-surface movable body.

The present disclosure is made in view of the above situation, and a main purpose thereof is to provide an image generating device which generates a synthesized image from which one is able to intuitively grasp a relation between an image and a traveling position of a water-surface movable body.

SUMMARY

The problem to be solved by the present disclosure is as described above, and measures to solve the problem and effects thereof are described as follows.

According to the first aspect of the present disclosure, an image generating device with the following configuration is provided. That is, the image generating device includes an attitude acquiring part, a traveling route acquiring part, a traveling route display data generating part, and a data synthesizing part. The attitude acquiring part acquires attitude information indicative of an attitude of an imaging device or a water-surface movable body where the imaging device is installed. The traveling route acquiring part acquires a traveling route of the water-surface movable body based on a detection result of at least one of a position and a direction of the water-surface movable body. The traveling route display data generating part generates traveling route display data based on the attitude information and the traveling route. The data synthesizing part generates a synthesized image in which the traveling route display data is synthesized with an image outputted from the imaging device.

According to the second aspect of the present disclosure, a method of generating an image is provided with the following processing. The method includes acquiring attitude information indicative of an attitude of an imaging device or a water-surface movable body where the imaging device is installed, acquiring a traveling route of the water-surface movable body based on a detection result of at least one of a position and a direction of the water-surface movable body, generating traveling route display data based on the attitude information and the traveling route, and generating a synthesized image in which the traveling route display data is synthesized with an image outputted from the imaging device.

According to this, the surrounding image and the traveling route of the water-surface movable body are displayed in the synthesized image, and thus, the traveling route can be grasped intuitively.

DETAILED DESCRIPTION

Figure 1:
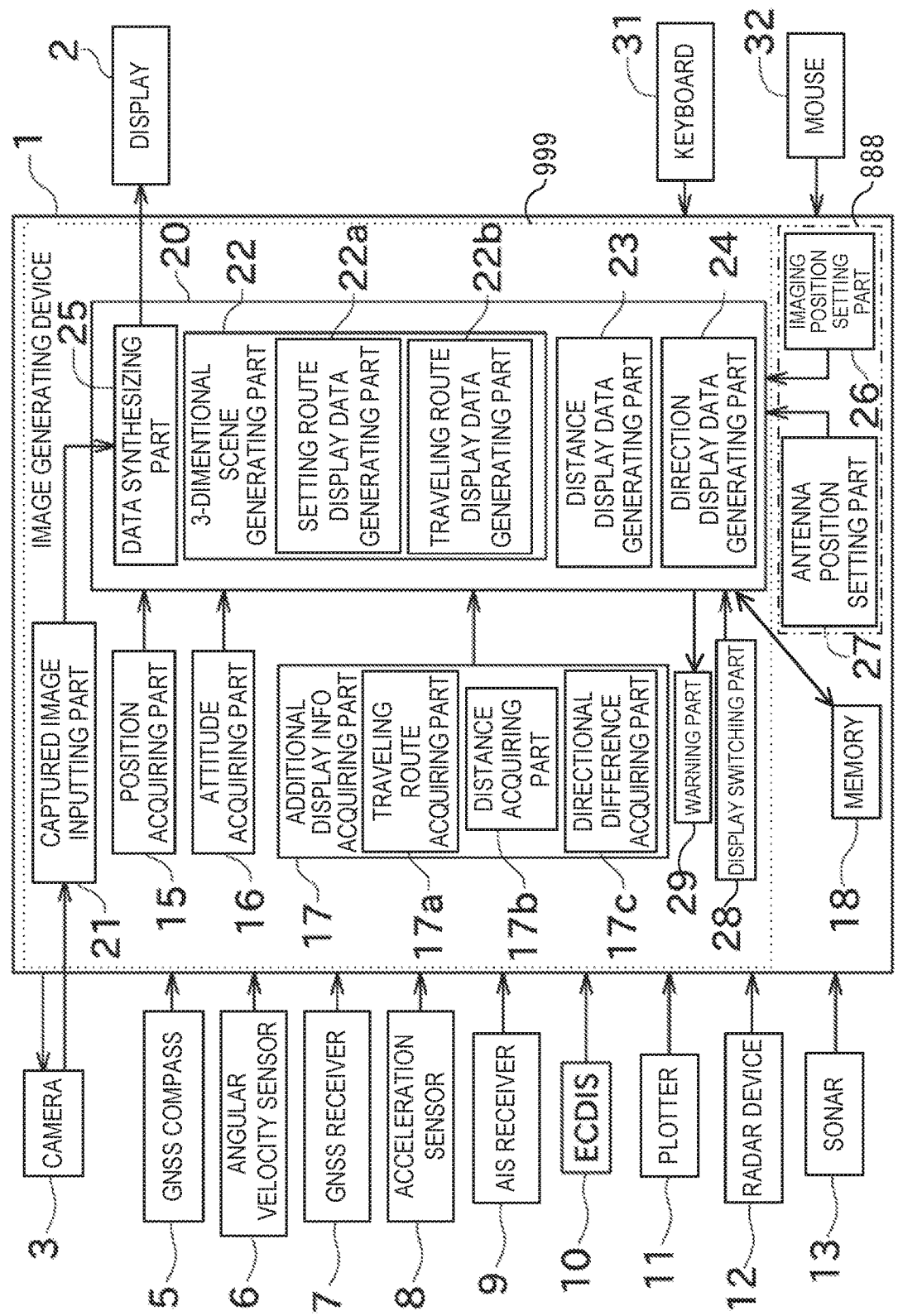
FIG. 1 is a block diagram illustrating the entire configuration of an image generating device according to one embodiment of the present disclosure.
Figure 2:
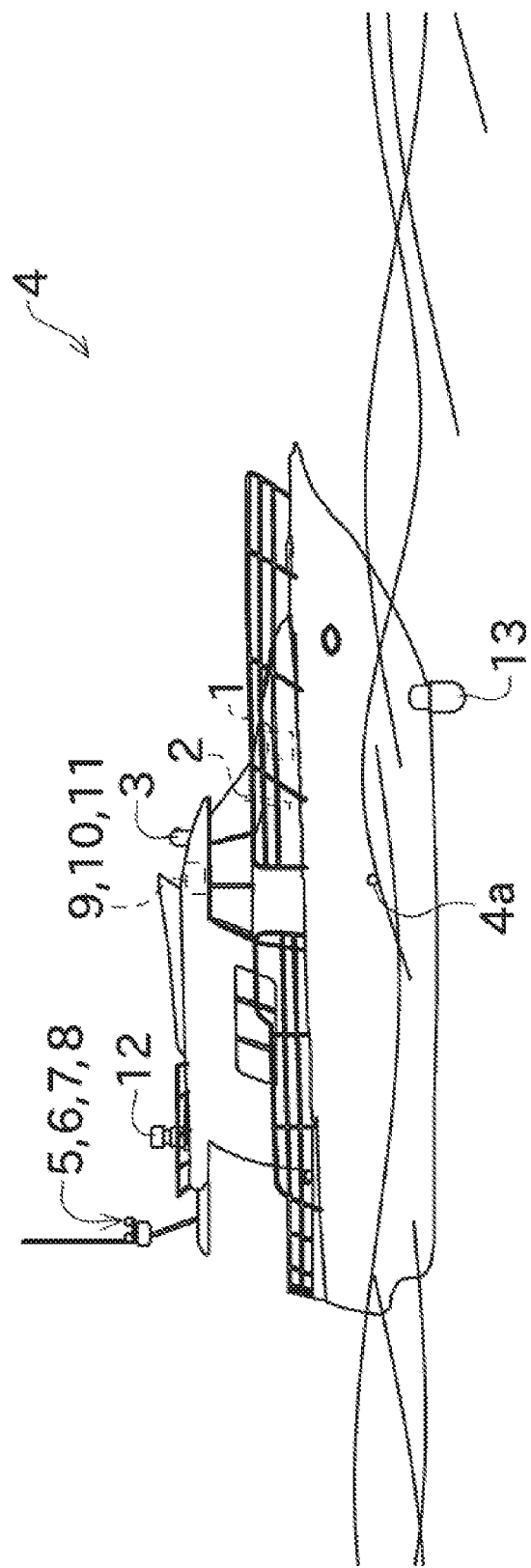
FIG. 2 is a side view illustrating various kinds of apparatuses provided to a ship.

Next, one embodiment of the present disclosure is described with reference to the drawings. FIG. 1 is a block diagram illustrating the entire configuration of an image generating device 1 according to one embodiment of the present disclosure. FIG. 2 is a side view illustrating various kinds of apparatuses provided to a ship 4.

For example, the image generating device 1 illustrated in FIG. 1 is a device which is mounted on the ship 4 (water-surface movable body) as illustrated in FIG. 2, and generates an image expressing a situation around the ship 4 in virtual reality based on the image captured by a camera 3 (imaging device). The image generated by the image generating device 1 may be displayed on a display unit 2.

For example, the display unit 2 may be configured as a display unit of a navigation support device to which an operator who operates the ship 4 refers. However, the display unit 2 is not limited to the above, and, for example, may be a display unit of a portable computer which is carried by an assistant operator who monitors a situation around the ship 4, a display unit for a passenger to watch something in a cabin of the ship 4, a head mounted display, such as a wearable glass, which the passenger wears, or a display part of a display unit disposed at an administration authority which manages an operating situation distant from the ship 4.

The image generating device 1 may synthesize the image around the ship 4 imaged by the camera 3 installed on the ship 4, and the display data which expresses additional display information around the ship 4 in virtual reality (described later in detail) to generate a synthesized image which is an output image to the display unit 2.

Next, mainly referring to FIG. 1, the camera 3 and the various kinds of ship apparatus which are electrically connected to the image generating device 1 are described.

The camera 3 may be configured as a wide angle video camera which images the surrounding of the ship 4. This camera 3 may have a live output function, which can generate video data (image data) as an imaging result on real time and output it to the image generating device 1. As illustrated in FIG. 2, the camera 3 may be installed on the ship 4 so that its imaging direction is horizontally forward from the hull of the ship.

The camera 3 may be attached to the ship 4 through a rotary mechanism (not illustrated), and by accepting from the image generating device 1 an input of a signal instructing a pan/tilt operation, it can change the imaging direction within a given angle range with respect to the hull of the ship 4. Moreover, since the height and attitude of the ship 4 change due to waves etc. variously, the height of the camera 3 also changes, and therefore, the attitude (the imaging direction) may also change three-dimensionally.

The image generating device 1 of this embodiment may be electrically connected to, in addition to the camera 3, a GNSS compass 5 (a direction sensor, an attitude sensor), an angular velocity sensor 6, a GNSS receiver 7, an acceleration sensor 8, an AIS receiver 9, an ECDIS 10, a plotter 11, a radar device 12, a sonar 13, etc., as the ship apparatuses.

The GNSS compass 5 may be provided with a plurality of GNSS antennas (positioning antenna) fixed to the ship 4. The GNSS compass 5 may calculate spatial relationships of the respective GNSS antennas based on radio waves received from positioning satellites. In particular, the GNSS compass 5 of this embodiment may be configured to calculate the spatial relationships of the GNSS antennas based on phase differences of carrier phases of the radio waves received by the respective GNSS antennas (since this processing is known, detailed description is omitted). Thus, a bow direction or heading of the ship 4 can be acquired with sufficient accuracy.

The GNSS compass 5 may be capable of acquiring the attitude of the ship 4 three-dimensionally. In other words, the GNSS compass 5 may be capable of detecting, in addition to the bow direction (i.e., a yaw angle of the ship 4), a roll angle and a pitch angle of the ship 4. Attitude information on the ship 4 acquired by the GNSS compass 5 is outputted to an attitude acquiring part 16 of the image generating device 1, and other ship apparatuses which utilize the attitude information.

The angular velocity sensor 6 may be comprised of, for example, a known oscillation gyrosensor, and may be capable of detecting a yaw angular velocity, a roll angular velocity, and a pitch angular velocity of the ship 4 at a cycle shorter than an attitude detecting interval of the GNSS compass 5 (e.g., 1 second). By using both the angle detected by the GNSS compass 5 and an integrated value of the angular velocities detected by the angular velocity sensor 6, the attitude of the ship 4 can be acquired at the time interval shorter than in a case where only the GNSS compass 5 is used. Moreover, the angular velocity sensor 6 may function as an alternative device for acquiring the attitude information, when the detection of the attitude by the GNSS compass 5 is impossible, for example, due to the radio wave from the positioning satellite being interrupted by an obstacle, such as a bridge.

The GNSS receiver 7 may calculate the position of the ship 4 (in detail, a latitude, a longitude, and a height of the GNSS antenna) based on the radio wave which the GNSS antenna received from the positioning satellite. The GNSS receiver 7 may output the acquired positional information to a position acquiring part 15 of the image generating device 1, and other ship apparatuses utilizing the positional information.

The acceleration sensor 8 may be configured, for example, as a known static capacitance sensor, and may be capable of detecting accelerations in the yaw axis, the roll axis, and the pitch axis of the ship 4 at a cycle shorter than the position detecting interval of the GNSS receiver 7 (e.g., 1 second). By using both the position detected by the GNSS receiver 7, and a double integrated value of the acceleration detected by the acceleration sensor 8, the position of the ship 4 can be acquired at a time interval shorter than in the case where only the GNSS receiver 7 is used. Moreover, the acceleration sensor 8 may function as an alternative device for acquiring the positional information, when the detection of the position by the GNSS receiver 7 is impossible due to the radio wave from the positioning satellite being interrupted.

As illustrated in FIG. 2, in this embodiment, the angular velocity sensor 6, the GNSS receiver 7, and the acceleration sensor 8 may be built in the GNSS compass 5. However, some or all of the angular velocity sensor 6, the GNSS receiver 7, and the acceleration sensor 8 may be provided independently from the GNSS compass 5.

The AIS receiver 9 may be to receive AIS information transmitted from another ship, a land station, etc. The AIS information may include various information, such as the position (latitude and longitude), a length and a width, a type and identification information, a traveling speed, a course, and a destination of another ship which travels around the ship 4, and the position and identification information of a landmark.

The ECDIS 10 may acquire the positional information of the ship 4 from the GNSS receiver 7 and output the information around the ship 4 to the image generating device 1 based on stored electronic nautical chart information.

The plotter 11 may be capable of generating information on a traveling trace of the ship 4 by continuously acquiring the position of the ship 4 from the GNSS receiver 7. Moreover, the plotter 11 may be capable of causing a user to set a plurality of waypoints (points through which the ship 4 is scheduled to pass) to generate a setting route by serially connecting these waypoints.

The radar device 12 may be capable of detecting a target object, such as another ship, which exists around the ship 4. Moreover, this radar device 12 may have a known target tracking (TT) function, which is capable of acquiring and tracking the target object to calculate the position and a velocity vector of the target object (TT information).

The sonar 13 may detect a school of fish etc. by transmitting an ultrasonic wave underwater and receiving a reflection wave which is a reflection of the ultrasonic wave at a school of fish etc.

The image generating device 1 may be connected to a keyboard 31 and a mouse 32 which are operated by the user. The user may be able to perform various kinds of instructions related to the generation of the image by operating the keyboard 31 and the mouse 32. The instructions may include the pan/tilt operation of the camera 3, and settings of a point of view of the synthesized image.

Next, a configuration of the image generating device 1 is described in detail mainly with reference to FIG. 1.

As illustrated in FIG. 1, the image generating device 1 may include a captured image inputting part 21, the position acquiring part 15, the attitude acquiring part 16, an additional display information acquiring part 17, a memory 18, an imaging position setting part 26, an antenna position setting part 27, a display switching part 28, a warning part 29, and a synthesized image generating part 20. The captured image inputting part 21, the position acquiring part 15, the attitude acquiring part 16, an additional display information acquiring part 17, a display switching part 28, a warning part 29, and a synthesized image generating part 20 shall be collectively referred as "processing circuitry" 999. And the imaging position setting part 26 and the antenna position setting part 27 shall be collectively referred as "a position setting interface" 888.

In detail, the image generating device 1 may be configured as a known computer, and although is not illustrated, it may include a CPU, a ROM, a RAM, and a HDD. Further, the image generating device 1 may be provided with a GPU for performing three-dimensional image processing (described later) at high speed. Moreover, the HDD stores, for example, software for executing image synthesizing processing of the present disclosure. By collaboration of the hardware and the software, the image generating device 1 can be functioned as the captured image inputting part 21, etc. described above.

The captured image inputting part 21 may be capable of accepting an input of the image data outputted from the camera 3, for example, at 30 frames per second. The captured image inputting part 21 may output the inputted image data to the synthesized image generating part 20 (a data synthesizing part 25 described later).

The position acquiring part 15 may acquire the current position of the ship 4 on real time based on the detection results of the GNSS receiver 7 and the acceleration sensor 8.

The attitude acquiring part 16 may acquire the current attitude of the ship 4 on real time based on the detection results of the GNSS compass 5 and the angular velocity sensor 6. Moreover, the attitude acquiring part 16 may acquire the current attitude of the camera 3 (the attitude with respect to an external reference, such as the water surface, instead of the attitude with respect to the ship 4) on real time based on the current attitude of the ship 4 and the instruction of the pan/tilt operation to the camera 3.

Note that it may be configured so that the attitude of the camera 3 is detected directly by attaching an attitude detection sensor, such as the GNSS compass 5, to the camera 3 (in detail, a part of which the attitude changes according to the pan/tilt operation). Alternatively, it may be configured to detect the attitude of the camera 3 based on the image captured by the camera 3. In detail, the attitude of the camera 3 may be detected based on the position of the water surface in the image captured by the camera 3, or its change.

The additional display information acquiring part 17 may acquire information which is additionally displayed to the image captured by the camera 3 (additional display information) based on information outputted to the image generating device 1 from the AIS receiver 9, the ECDIS 10, the plotter 11, the radar device 12, the sonar 13, etc. In detail, the additional display information acquiring part 17 may function as a traveling route acquiring part 17a which acquires a traveling route which is a scheduled route along which the ship 4 travels, a distance acquiring part 17b which acquires a distance from the reference position, such as a given setting route, and a directional difference acquiring part 17c which acquires a difference between a direction of the setting route and a traveling direction of the ship (directional difference). Note that details of the additional display information will be described later.

Alternatively, the position acquiring part 15, the attitude acquiring part 16, and the additional display information acquiring part 17 may be configured to acquire information calculated by an apparatus (e.g., various kinds of sensors) exterior from the image generating device 1, or may be configured to acquire information calculated inside the image generating device 1 (a part which calculates the information based on the detection value(s)).

The memory 18 in FIG. 1 may be configured as a memory which stores various kinds of information. This memory 18 may store setting values etc. for generating a virtual reality object.

The imaging position setting part 26 may set the position (imaging position) of the camera with respect to the ship 4, in detail, the position of the camera 3 in the longitudinal direction and the width direction of the ship, and the position of the camera 3 in the vertical direction (a height of the camera 3). Although the height of the camera 3 may be a height from a waterline which normally assumed for the ship 4, it may be, for example, a height from the bottom of the ship, without being limited to the height from the waterline. This setting of the imaging position may be performed, for example, by the user operating the keyboard 31 and the mouse 32 to input a result of an actual measurement of the position of the camera 3.

The antenna position setting part 27 may be capable of setting the position of the GNSS antenna (antenna position)

with respect to the ship 4. This antenna position may be, for example, a position in the longitudinal direction, the width direction, and the vertical direction of the ship on the basis of a control standard point 4a which is a position used as a standard of a control. Although this control standard point 4a may be defined variously, it may be defined at a position in this embodiment, which is located at the center of the hull of the ship 4, and is located at the same height as the waterline which is normally assumed. The setting of the antenna position may be performed, for example, by inputting actual measurement values, similar to the imaging position described above.

The display switching part 28 may perform processing for switching DISPLAY/NOT-DISPLAY and a display mode of the virtual reality object displayed on the display unit 2 (details will be described later).

The warning part 29 may warn to the user when a given condition is satisfied. The warning part 29 may be configured to generate a warning sound by itself, or may be configured to transmit a given signal to an external warning sound generating device to generate the warning sound. Moreover, the warning is not limited to the warning sound. For example, the warning part 29 may be configured to transmit a given signal to the display unit 2 to display a warning on a screen. Note that the condition when the warning part 29 generates the warning will be described later.

The position acquiring part 15, the attitude acquiring part 16, the additional display information acquiring part 17, the memory 18, the imaging position setting part 26, and the antenna position setting part 27 may output the acquired, stored, and set information to the synthesized image generating part 20.

The synthesized image generating part 20 may be to generate the synthesized image to be displayed on the display unit 2. The synthesized image generating part 20 may include a three-dimensional scene generating part 22, a distance display data generating part 23, a direction display data generating part 24, and a data synthesizing part 25.

Figure 5:
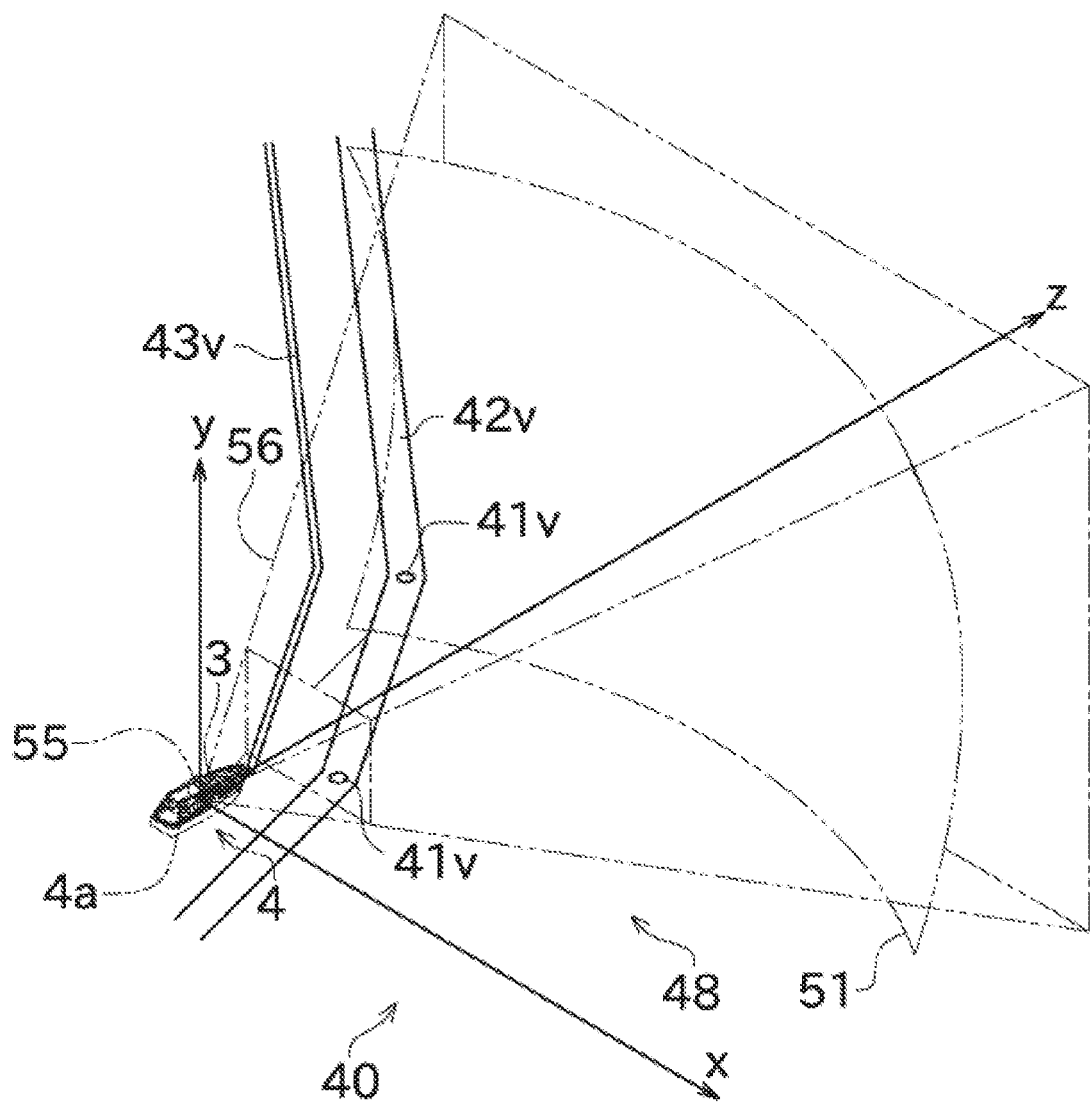
FIG. 5 is a conceptual view illustrating a three-dimensional scene data which is generated by placing the virtual reality object in a three-dimensional virtual space, and a projection screen placed in the three-dimensional virtual space.

As illustrated in FIG. 5, the three-dimensional scene generating part 22 may build a virtual reality three-dimensional scene by placing in a three-dimensional virtual space 40 virtual reality objects 41v, 42v, and 43v corresponding to the additional display information. Thus, three-dimensional scene data 48 (three-dimensional display data) which is data of a three-dimensional scene may be generated. Note that details of the three-dimensional scene will be described later. Moreover, the three-dimensional scene generating part 22 may include a setting route display data generating part 22a which generates a virtual reality object for displaying the setting route (setting route display data), and a traveling route display data generating part 22b which generates a virtual reality object for displaying the traveling route (traveling route display data).

The distance display data generating part 23 may generate distance display data for displaying a distance from the reference position, such as the setting route, to the ship 4. The direction display data generating part 24 may generate direction display data for displaying a direction of the ship, a difference in the traveling direction between the setting route and the traveling route (directional difference), etc.

The data synthesizing part 25 may perform processing for generating and outputting an image (synthesized image) in which the display data generated by the three-dimensional scene generating part 22, the distance display data generating part 23, and the direction display data generating part 24 are synthesized with the captured image of the camera 3.

Note that details of the generation processing of the display data and the data synthesizing processing will be described later.

Figure 3:
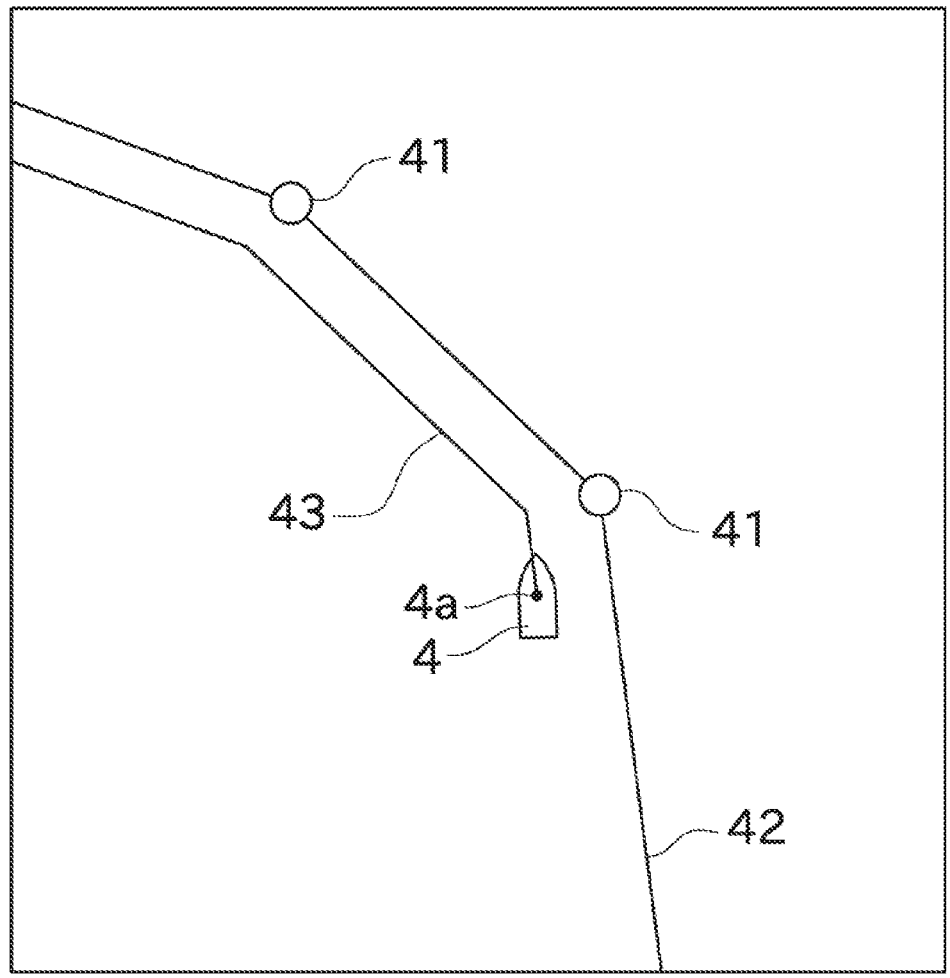
FIG. 3 is a conceptual view illustrating waypoints, a setting route, and a traveling route which are displayed by the image generating device as virtual reality objects.

Next, the additional display information acquired by the additional display information acquiring part 17 is described in detail. FIG. 3 is a conceptual view illustrating one example of the additional display information to be displayed on the image generating device 1.

The additional display information may be information additionally displayed to the image captured by the camera 3, and may be varied according to the purposes and functions of the ship apparatuses connected to the image generating device 1. For example, as for the sensors, such as the GNSS compass 5, which detect the position or the attitude, the additional display information may be the traveling route generated based on the detection values (the generating method will be described later), and as for the AIS receiver 9, it may be the received AIS information described above (e.g., the position and heading of another ship, the position of a buoy, and the position of a virtual buoy). As for the ECDIS 10, the additional display information may be the positions of riskous waters, traveling prohibited areas, lighthouses, buoys, which are contained in the electronic nautical chart. As for the plotter 11, the additional display information may be the positions of the recorded trace of the ship 4, the setting route, the waypoints, a destination area (an area indicative of a place of arrival), and stopping area(s) (area(s) indicative of stopping location(s)). As for the radar device 12, the additional display information may be the position, speed, etc. of the detected target object. As for the sonar 13, the additional display information may be the position of the detected school of fish. These information may be inputted into the image generating device 1 on real time from the ship apparatuses. The additional display information acquiring part 17 may assign to each inputted additional display information, identification information (e.g., an identification number) for identifying and managing the information uniquely.

FIG. 3 illustrates one example of the additional display information located around the ship 4. In FIG. 3, on the sea surface (on the water surface), waypoints 41 indicative of destinations and passing points, a setting route 42 having polygonal-like lines indicative the setting route to the destination, and a traveling route 43 indicative of the traveling route having polygonal-like lines similar to the setting route, are defined.

Each additional display information may include at least information indicative of the position(s) (latitude and longitude) of one or more locations in the sea surface (water surface) on which the information is placed. For example, the additional display information indicative of the setting route 42 and the traveling route 43 may include information on the positions of two locations which indicate a bending part of the polygonal-like lines. Note that the information described above handled by the distance display data generating part 23 and the direction display data generating part 24 may not include the information indicative of the position(s).

Figure 4:
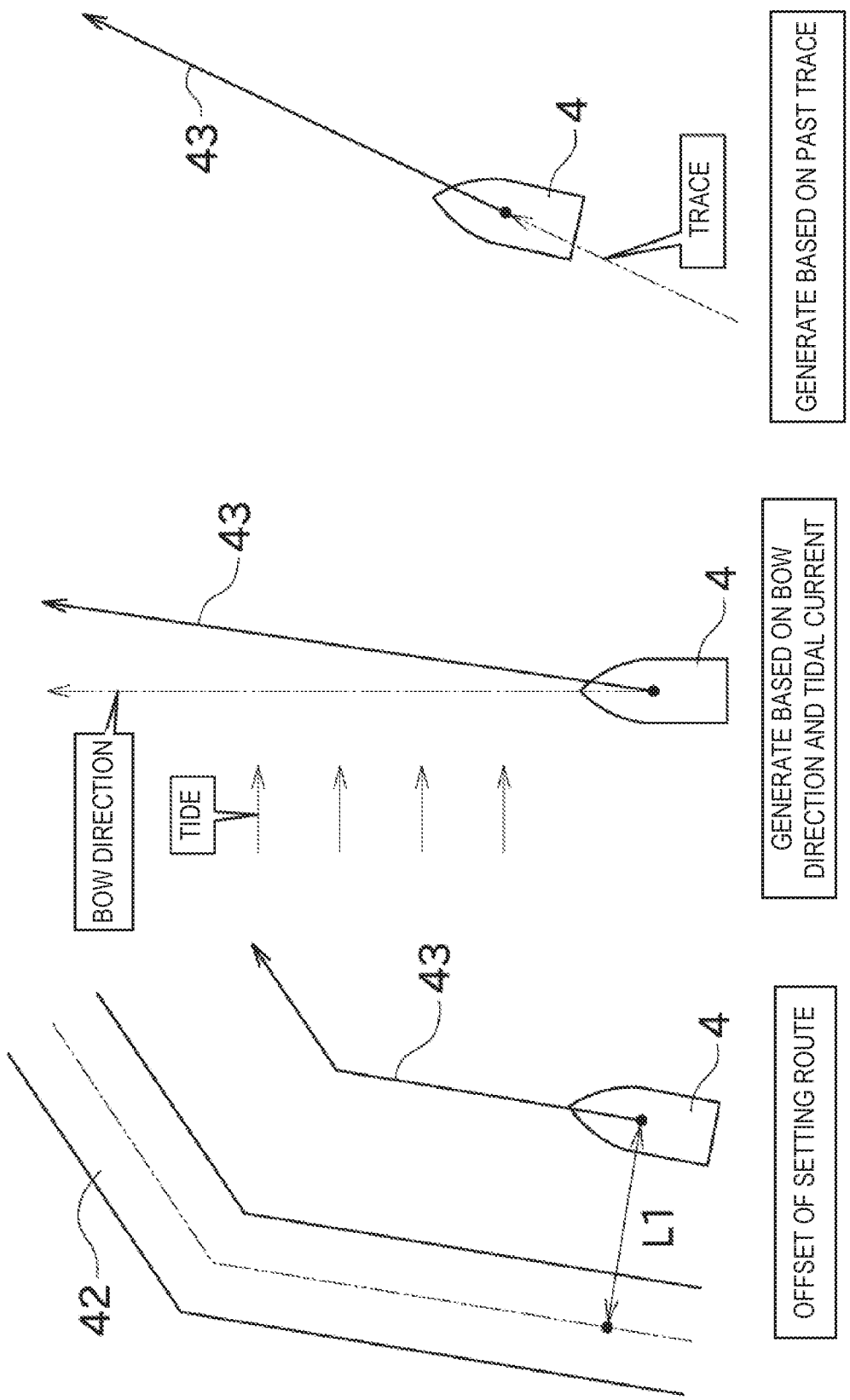
FIG. 4 is a view illustrating one example of a method of generating the traveling route.

Next, the method of generating the traveling route 43 is described with reference to FIG. 4. FIG. 4 is a view illustrating one example of the method of generating the traveling route 43.

The traveling route 43 may be a presumed route on which, based on the detection result of at least one of the position and the direction of the ship 4, the ship 4 travels after this detection timing. The position of the setting route 42 may be set beforehand, and the position of the setting route 42 will not be changed unless the user changes the setting. On the other hand, the traveling route 43 may be presumed based on the position, the direction, etc. at the detection timing (normally, now), and the traveling route 43 may be generated and updated each time the detection value is updated. The traveling route 43 may be generated in order to grasp a distance to the ship 4 from the setting route 42, the traveling prohibited area (or an area where the user does not want to travel), an area where the user want to travel, etc. There may be various methods of generating the traveling route 43. In FIG. 4, three examples are illustrated among these.

According to the method illustrated as "OFFSET OF SETTING ROUTE" on the left side of FIG. 4, the image generating device 1 first may calculate a distance L1 to the current position of the ship 4 (e.g., the center of the ship 4 in the width direction) from the setting route 42. Next, the image generating device 1 may offset the setting route 42 toward the ship 4 by the distance L1 to generate the traveling route 43. In other words, the traveling route 43 which passes through the current position of the ship 4, and the distance from the setting route 42 is maintained at the same value may be generated.

According to the method illustrated as "GENERATE BASED ON BOW DIRECTION AND TIDAL CURRENT" at the center of FIG. 4, the image generating device 1 may first detect the bow direction of the ship 4 based on the GNSS compass 5, etc. Next, the image generating device 1 may detect tidal current information (a direction and a speed of the tidal current) by using a current sensor (not illustrated) provided to the ship 4. Note that the image generating device 1 may be configured to acquire the tidal current information from an apparatus exterior from the ship 4. Then, the image generating device 1 may presume the traveling direction of the ship 4 in consideration of the bow direction and an influence of the ship 4 received from the tidal current (a drifting direction and a magnitude of the tidal current). A line indicative of the traveling direction may become the traveling route 43.

According to the method illustrated as "GENERATE BASED ON PAST TRACE" on the right side of FIG. 4, the image generating device 1 may first detect a trace of a given past time based on the past detection result of the GNSS receiver 7. Note that, when the plotter 11 stores the trace of the ship 4, the trace may be acquired from the plotter 11. Next, the image generating device 1 may presume the traveling direction of the ship 4, for example, by extending the latest traveling direction based on the past trace. A line indicative of the traveling direction may become the traveling route 43.

Note that the method of generating the traveling route 43 described above is one example, and the traveling route 43 may also be generated by a different method. For example, the image generating device 1 can generate the traveling route 43 by extending the bow direction, without using the tidal current information. Alternatively, the image generating device 1 can also presume the traveling direction further in consideration of the speed of the ship 4, in addition to the bow direction and the tidal current information. Moreover, the traveling route 43 having a length in the width direction (e.g., the width of the ship) can also be generated, instead of using one location in the ship 4.

Next, a construction of the three-dimensional scene by the three-dimensional scene generating part 22, and a synthesis of the images by the data synthesizing part 25 are described in detail with reference to FIG. 5. FIG. 5 is a conceptual view illustrating a three-dimensional scene data 48 which is generated by placing the virtual reality objects 41v, 42v, and 43v in the three-dimensional virtual space 40, and a projection screen 51 placed in the three-dimensional virtual space 40.

As illustrated in FIG. 5, the three-dimensional virtual space 40 where the virtual reality objects 41v, 42v, and 43v are placed by the three-dimensional scene generating part 22 may be configured as a rectangular coordinate system in which a suitable reference position of the ship 4 (e.g., the control standard point 4a described above) is used as the origin, and the xz plane which is a horizontal plane imitates the sea surface (water surface). In the example of FIG. 5, the coordinate axes may be defined so that the +z direction always corresponds to the bow direction, the +x direction corresponds to the rightward direction, and the +y direction corresponds to the upward direction. Each location (coordinates) in the three-dimensional virtual space 40 may be set so as to correspond to an actual location around the ship 4.

FIG. 5 illustrates one example in which the virtual reality objects 41v, 42v, and 43v are placed in the three-dimensional virtual space 40 in order to express the situation around the ship 4 illustrated in FIG. 3. Each of the virtual reality objects 41v, 42v, and 43v may be placed contacting the xz plane so that a relative position of the additional display information indicated by the virtual reality object with respect to the ship 4 on the basis of the bow direction can be reflected. For determining the positions where the virtual reality objects 41v, 42v, and 43v are placed, a calculation using the position of the GNSS antenna set by the antenna position setting part 27 illustrated in FIG. 1 is performed.

The virtual reality object 41v of the waypoint 41 may be expressed three-dimensionally in a thin disk shape. The virtual reality object 42v of the setting route 42 and the traveling route 43 may be expressed in a three-dimensional shape in which an elongated plate having a certain thickness and width is bent in a polygonal-like line.

As described above, the three-dimensional scene generating part 22 may generate the three-dimensional scene data 48. In the example of FIG. 5, since the virtual reality objects 41v, 42v, and 43v are placed on the basis of the direction where the position of the ship 4 is used as the origin, when the position of the ship 4 (positions in the east-west direction and the north-south direction) changes, or the bow direction changes by the ship turning etc. from the state of FIG. 3, a new three-dimensional scene where the virtual reality objects 41v, 42v, and 43v are again placed may be constructed, and the three-dimensional scene data 48 may be updated. Moreover, for example, if the positions of the waypoint 41, the setting route 42, and traveling route 43 with respect to the ship 4 is changed or the direction of the traveling route 43 is changed by the ship 4 being moved from the state of FIG. 3, the three-dimensional scene data 48 may be updated so as to reflect the latest additional display information.

Then, the data synthesizing part 25 may place in the three-dimensional virtual space 40 the projection screen 51 which defines a position and a range where the captured image of the camera 3 is projected. The synthesis of the images can be realized by setting the position and the direction of a viewpoint camera 55 (described later) so that both the virtual reality objects 41v, 42v, and 43v and the projection screen 51 are included in the field of view.

The data synthesizing part 25 may simulate the position and the direction of the camera 3 mounted on the ship 4 in the three-dimensional virtual space 40, and place the projection screen 51 so as to directly oppose to the camera 3. As for the simulation of the position of the camera 3, the position of the camera 3 on the basis of the hull can be obtained based on the setting values in the imaging position setting part 26 illustrated in FIG. 1.

For the simulation of the position and the direction of the camera 3, the change in the direction due to the pan/tilt operation of the camera 3 described above may be taken into consideration. Further, this simulation may be performed based on the positional information and the attitude information acquired by the position acquiring part 15 and the attitude acquiring part 16 so that the changes in the attitude and the height of the ship 4 are reflected to the change in the position and the direction of the camera 3. The data synthesizing part 25 may be interlocked with the change in the position and the direction of the camera 3 to change the position and the direction of the projection screen 51 placed in the three-dimensional virtual space 40.

Then, the data synthesizing part 25 may generate the two-dimensional image by performing known rendering processing to the three-dimensional scene data 48 and the projection screen 51. In more detail, the data synthesizing part 25 may place the viewpoint camera 55 in the three-dimensional virtual space 40, and define a visual cone 56 which defines a range to be rendered so that the viewpoint camera 55 is located at a vertex and the line-of-sight direction becomes the center axis. Then, the data synthesizing part 25 may convert by a perspective projection, vertex coordinates of a polygon located inside the visual cone 56 among polygons which constitute each object (the virtual reality objects 41v, 42v, and 43v and the projection screen 51) into coordinates of a two-dimensional virtual screen corresponding to a display area of the synthesized image in the display unit 2. Then, based on the vertex placed on the virtual screen, the two-dimensional image may be generated by generating and processing pixels at given resolution.

The two-dimensional image generated in this way may include display data obtained by rendering the three-dimensional scene data 48 (in other words, a figure as a rendering result of the virtual reality objects 41v, 42v, and 43v). In detail, the two-dimensional image may include waypoint display data 41d indicative of the waypoint 41, setting route display data 42d indicative of the setting route 42, traveling route display data 43d indicative of the traveling route 43. Moreover, during the generation process of the two-dimensional image, the captured image of the camera 3 may be pasted at a position corresponding to the projection screen 51. Therefore, the synthesis of the images by the data synthesizing part 25 may be realized. Since the projection screen 51 may have a shape which is curved so as to conform to a spherical shell centering on the camera 3, distortion of the captured image due to the perspective projection can be prevented.

The viewpoint camera 55 may be to define the point of view of the synthesized image, and therefore, the user can set the position and the direction, for example, by using the keyboard 31 and the mouse 32. However, the data synthesizing part 25 may be in a mode in which the position and the direction of the viewpoint camera 55 automatically change so that they always are in agreement with the position and the direction of the camera 3 (viewpoint following mode), as a mode when generating the synthesized image. In this viewpoint following mode, since the entire field of view of the viewpoint camera 55 is always covered with the projection screen 51 (i.e., the captured image of the camera 3), the synthesized image with presence can be realized.

Figure 6:
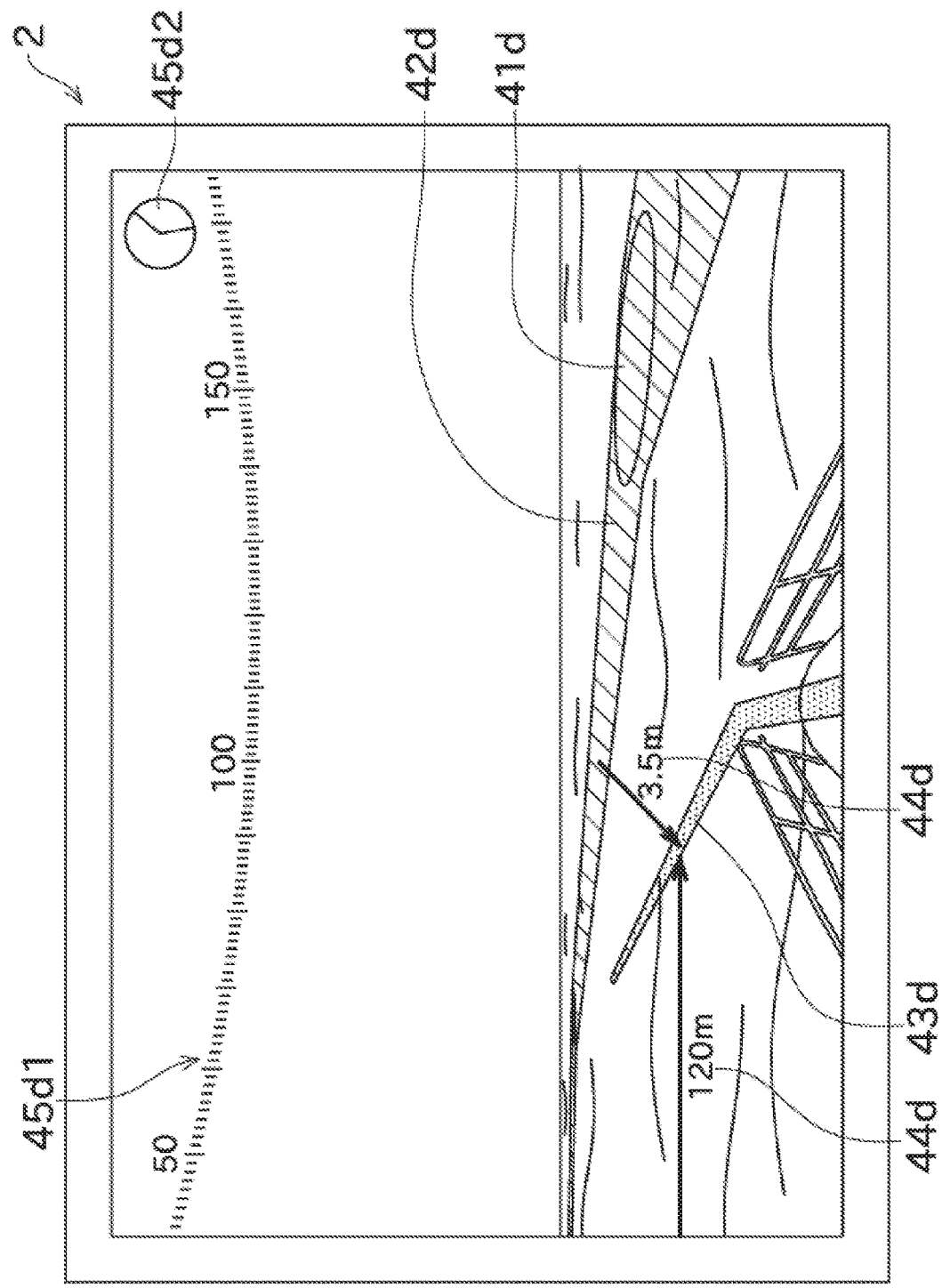
FIG. 6 is a view illustrating a synthesized image which is outputted from a data synthesizing part.
Figure 7:
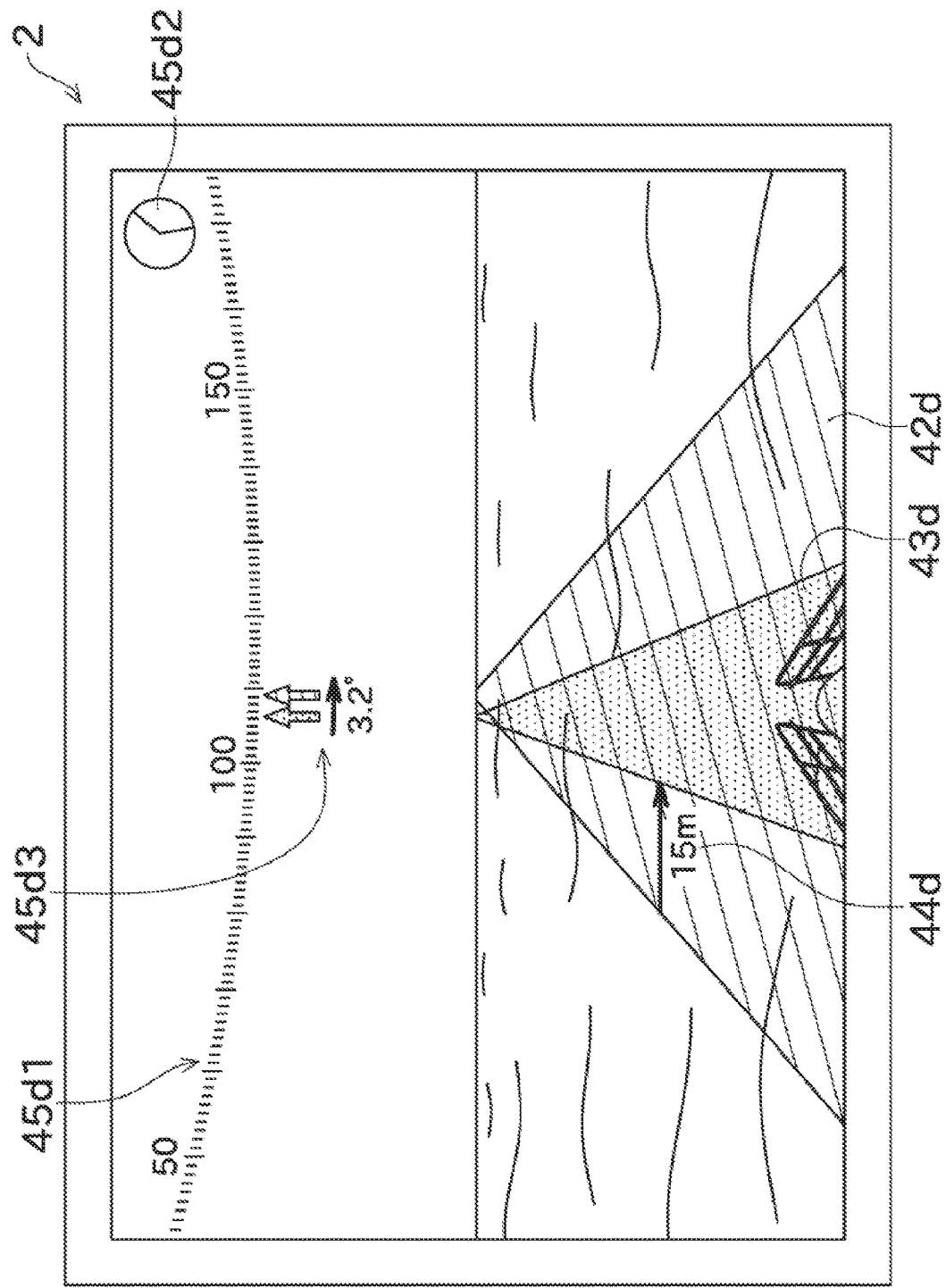
FIG. 7 is a view illustrating another synthesized image which is outputted from the data synthesizing part.

Next, the synthesized image in which the image captured by the camera 3 is synthesized with the two-dimensional image based on the three-dimensional scene data 48 is described with reference to FIGS. 6 and 7. FIGS. 6 and 7 are views illustrating the synthesized image outputted from the data synthesizing part 25.

In FIG. 6, the image captured by the camera 3 of the ship 4 is included in the situation illustrated in FIG. 3. In detail, as the captured image, the sea surface is displayed, and a bow part of the ship 4 is displayed at the center of a lower part of the captured image. In the synthesized image of FIG. 6, display data 41d, 42d, and 43d expressing the additional display information are placed so as to overlap with the captured image.

The display data 41d, 42d, and 43d may be generated as a result of rendering the three-dimensional shapes of the virtual reality objects 41v, 42v, and 43v which constitute the three-dimensional scene data 48 illustrated in FIG. 5 from the point of view of the same position and the same direction as the camera 3. Therefore, even when the display data 41d, 42d, and 43d are superimposed on the realistic image captured by the camera 3, an inappropriate appearance will not substantially be generated.

Note that, in this embodiment, the virtual reality object (three-dimensional scene data 48) created in consideration of the attitude of the camera 3 may be created as a layer different from the captured image, and the synthesized image may be then generated by piling up the layers. Alternatively, the virtual reality object may be created not as the image in consideration of the attitude but as a data sequence comprised of a position (coordinates) of a pixel and a color at the position, and the data sequence may be synthesized with the captured image. Alternatively, the virtual reality object may be created as an image without taking the attitude of the camera 3 into consideration, and the image may be synthesized with the captured image taking the attitude of the camera 3 into consideration when synthesizing with the captured image. In any of the methods, the virtual reality object may be rendered in consideration of the attitude of the camera 3.

As illustrated in FIG. 6, the display data 41d, 42d, and 43d which express the additional display information in virtual reality may be placed on the synthesized image as if they are placed on the sea surface of the captured image. In other words, the display data 41d, 42d, and 43d which express the additional display information in virtual reality may be displayed in an orientation matched with an inclination of a three-dimensional plane grasped from the water surface which appears in the captured image. In particular, the display data 41d, 42d, and 43d indicative of the waypoint 41, the setting route 42, and the traveling route 43 may be placed as if thin plates are pasted onto the sea surface. This may be realized by placing the virtual reality objects 41v, 42v, and 43v illustrated in FIG. 5 so as to contact the xz plane located below the camera 3 by a distance calculated based on the height set by the imaging position setting part 26 (see FIG. 1), and placing the projection screen 51 at a correct location in consideration of the position and the direction of the camera 3.

Note that display widths of the setting route display data 42d and the traveling route display data 43d may be changeable by settings. In the example illustrated in FIG. 6, the setting route display data 42d may be displayed to have the same width as the ship 4, and the traveling route display data 43d may be displayed by an elongated line (its width is thinner than the setting route display data 42d). Note that the traveling route display data 43d may be displayed to have a width thicker than the setting route display data 42d.

In the example illustrated in FIG. 7, the setting route display data 42d may be wider than the ship 4, and may be displayed with a desirable width within which the entire width of the ship 4 is located (i.e., a width within which a position offset of the ship 4 is permitted). On the other hand, the traveling route display data 43*d* may be displayed with the width of the ship. Therefore, in the example illustrated in FIG. 7, since the ship is to travel without the traveling route display data 43*d* deviating from the setting route display data 42*d*, the operator can intuitively grasp the current positional offset, and a distance to the positional offset which cannot be permitted.

Note that the display widths illustrated in FIGS. 6 and 7 are examples. For example, the setting route display data 42*d* and the traveling route display data 43*d* can be displayed, for example, in a form of a line, with a width less than the width of the ship, a width substantially equal to the width of the ship, or a width more than the width of the ship.

Moreover, although the traveling route 43 is presumed from the position, the direction, etc., it is not to predict the steering operation of the user. Therefore, for example, when the user turns the ship 4, the ship 4 will separate from the traveling route 43. That is, even if the traveling route 43 which is quite distant from the ship is displayed, it may not be very useful for the user. Therefore, in this embodiment, as illustrated in FIG. 6, the length of the traveling route display data 43*d* in the traveling direction is displayed shorter than the setting route display data 42*d* so that a front end thereof can be confirmed in the screen.

Moreover, in FIG. 6 or FIG. 7, distance display data 44*d* and the direction display data 45*d*1 to 45*d*3 are displayed. Since the distance display data 44*d* and the direction display data 45*d*1 to 45*d*3 are not data associated with the position, and do not have a shape, they may not be included in the three-dimensional scene data 48.

The distance display data 44*d* may be data for displaying a distance from the reference position set by the user to the ship 4 or the traveling route 43. As illustrated in FIG. 6, the distance display data 44*d* may include a numerical value indicative of a concrete distance from the reference position, and an arrow which connects measuring points of this distance. In the example illustrated in FIG. 6, the setting route 42 and the traveling prohibited area outside the screen may be set as the reference positions. The distance display data 44*d* may be displayed at a location associated with the traveling route 43 (e.g., near the traveling route 43, between the traveling route 43 and the reference position). Note that the calculation method of the numerical value indicative of the distance will be described later.

The direction display data 45*d*1 to 45*d*3 may be display data for calculating information related to the direction. In detail, in the synthesized image of FIG. 6, a direction scale 45*d*1 and a field-of-view display chart 45*d*2 may be displayed. The direction scale 45*d*1 may be displayed in an upper part of the screen, and it is formed in an arc shape so as to connect between the left end and the right end. In the direction scale 45*d*1, numerical values indicative of the direction corresponding to the image may be indicated. The field-of-view display chart 45*d*2 may be a figure which schematically expresses a range projected on the synthesized image among all the circumferences of the ship 4. Moreover, in FIG. 7, a directional difference display item 45*d*3 may further be displayed. The directional difference display item 45*d*3 may be a display item indicative of a directional difference in the traveling direction between the setting route 42 and the traveling route 43. Note that the directional difference may be acquired by the directional difference acquiring part 17*c*. In detail, the directional difference acquiring part 17*c* may acquire the directional difference by detecting a difference between the direction of the ship 4 or the traveling route 43 acquired by the method illustrated in FIG. 4, and the direction of the setting route 42. The directional difference display item 45*d*3 may include a numerical value indicative of the directional difference, and an arrow indicative of a direction of the directional difference. Moreover, in the example illustrated in FIG. 7, an arrow indicative of the direction of the setting route 42 and an arrow indicative of the direction of the traveling route 43 may be indicated on the direction scale 45*d*1.

Figure 8:
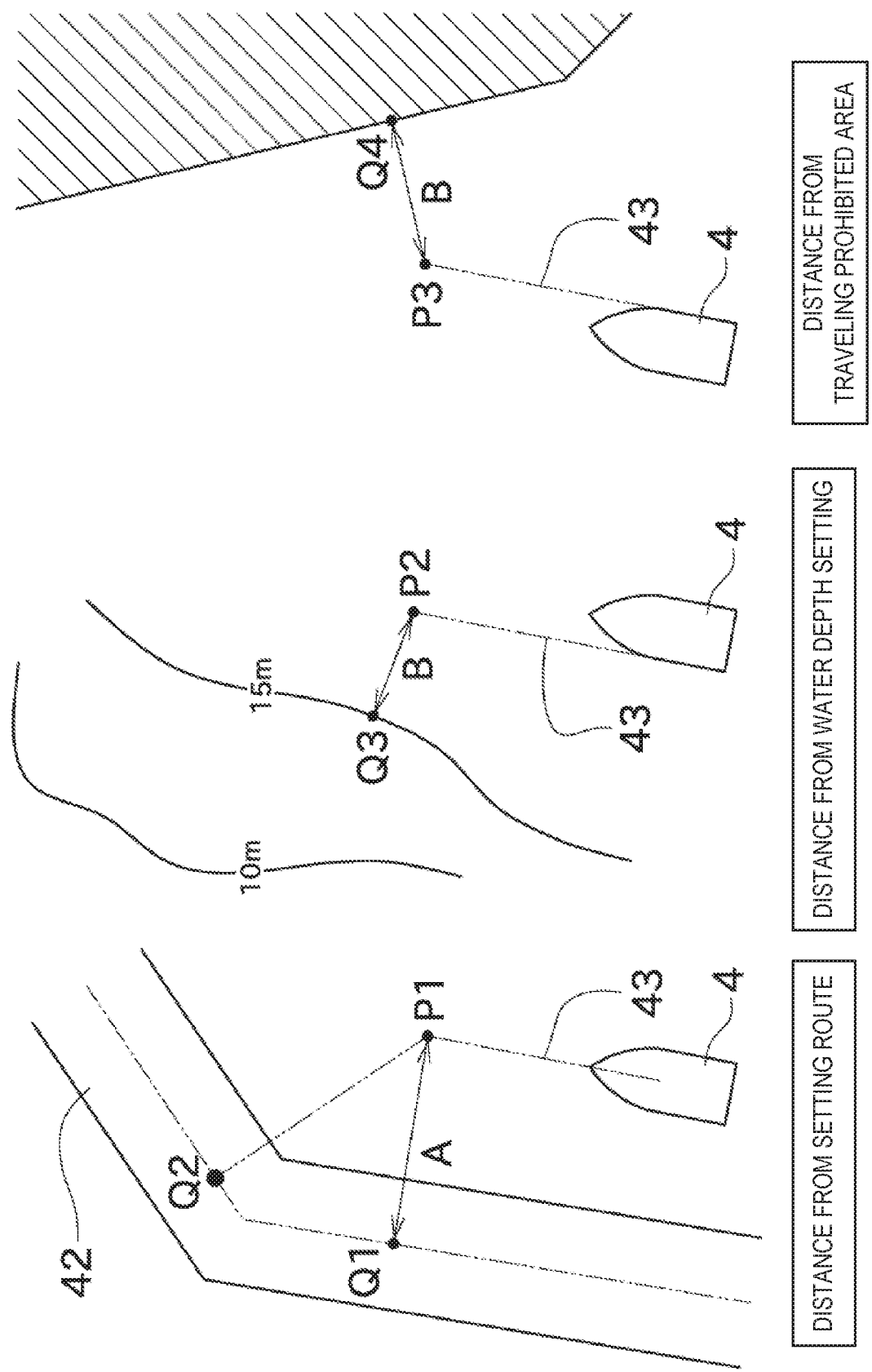
FIG. 8 is a view illustrating one example of a method of calculating a distance from a reference position.

Below, the method of calculating the distance from the reference position to the traveling route 43 is described with reference to FIG. 8. Note that this processing may be performed by the distance acquiring part 17*b*. FIG. 8 is a view illustrating one example of the method of calculating the distance from the reference position. In FIG. 8, three kinds of example reference positions are illustrated.

In the figure illustrated as "DISTANCE FROM SETTING ROUTE" on the left side of FIG. 8, a method of calculating the distance when the setting route 42 is used as the reference position (in detail, a reference line) is illustrated. In detail, the image generating device 1 may calculate a point P1 traveled ahead along the traveling route 43 from the center of the ship 4 in the width direction at the current position by a given distance. Next, the image generating device 1 may draw a line from the point P1 to a point (point Q1) on the setting route 42 (if the length in the width direction is included, it is the center position in the width direction) so that the line becomes the shortest, and then calculate the length of this line as a distance A. Here, by calculating the center of the ship 4 in the width direction and the center of the setting route 42 in the width direction, an accurate route offset can be detected, regardless of the width of the ship and the width of the setting route 42.

Note that, as illustrated in FIG. 7, when the setting route 42 indicates a width where the positional offset is permitted, a distance from an end of the setting route 42 in the width direction to an end of the width of the ship may be calculated. Moreover, when calculating the distance between the point P1 and the setting route 42, a point closer to the destination of the setting route 42 (e.g., the point Q2) may be selected as a priority, in addition to the condition in which the distance from the point P1 to the setting route 42 becomes short. Alternatively, such a point on the setting route 42 that the traveling direction of the ship 4 and the traveling direction of the setting route 42 become closer to each other may be selected as a priority.

In the figure illustrated as "DISTANCE FROM WATER DEPTH SETTING" at the center of FIG. 8, a method of calculating a distance from a water depth setting is illustrated. For example, the operator may set in advance a water depth at which there is a risk of stranding in consideration of the draft of the ship 4 as the water depth setting. The image generating device 1 may calculate a position of the water depth setting based on depth contours of nautical chart data. In this embodiment, since the water depth setting is 15 m, a depth contour indicating that the water depth is 15 m becomes the reference position (in detail, the reference line). Here, it is not desirable to become below the water depth setting at anywhere in the hull of the ship 4. Therefore, the image generating device 1 may calculate a point P2 which is ahead of the end of the ship 4 in the width direction (in detail, an end closer to the depth contour) along the traveling route 43 by a given distance. Then, the image generating device 1 may draw a line from the point P2 to a point (point Q3) so that the distance becomes the shortest to the depth contour indicative of the water depth setting, and calculates a length of this line as a distance B.

In the figure illustrated as "DISTANCE FROM TRAVELING PROHIBITED AREA" on the right side of FIG. 8, a method of calculating a distance when the traveling prohibited area is used as the reference position (in detail, a reference area) is illustrated. The traveling prohibited area may be an area where an event is held or there is a legal regulation, and therefore, the traveling of the ship 4 is prohibited. Therefore, the ship 4 may not be desirable to be in the traveling prohibited area at anywhere in the hull of the ship 4. Moreover, although the traveling prohibited area is a certain area, a boundary with an area where the traveling is not prohibited may be a line. Therefore, a distance C to the traveling prohibited area may be calculated by a method similarly to the water depth setting.

In the examples described above, the distances from the points P1, P2, and P3 on the traveling route 43 ahead of the ship 4, instead of the ship 4, may be measured to the reference positions. This is because, generally, since the ship cannot immediately stop and cannot immediately turn, the ship 4 cannot avoid passing through near the points P1, P2, and P3. Note that a distance from the ship 4 to the reference position may be calculated. Moreover, in FIG. 8, although the reference line (the setting route 42 and the depth contour) and the reference area are described as examples of the reference position, a reference point of which the number of positional information is one may also be set. The reference point may include an obstacle or a point set by the user (e.g., a location where the user experienced a good catch of fish) with only one positional information.

Figure 9:
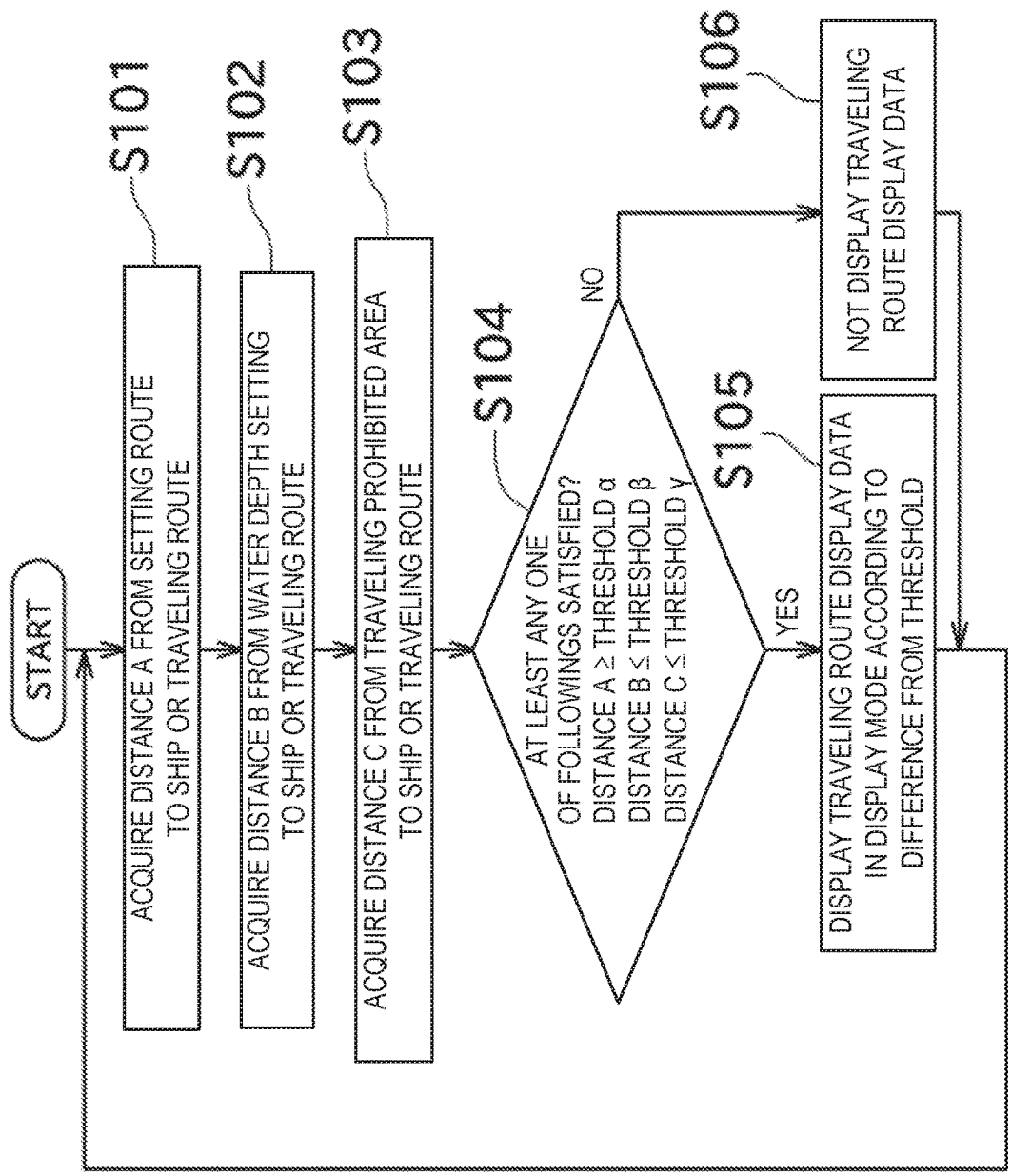
FIG. 9 is a flowchart illustrating processing for determining whether traveling route display data is to be displayed.

Next, processing for changing the display mode according to the switching between DISPLAY/NOT DISPLAY and the situation of the traveling route is described with reference to FIG. 9. FIG. 9 is a flowchart illustrating processing for determining DISPLAY/NOT DISPLAY of the traveling route display data.

While the traveling route display data 43d is useful for the user, for example, when various kinds of virtual reality objects are displayed, it may be sometimes desirable that the traveling route display data 43d is displayed only when required, in order to prevent the screen from becoming complicated. In consideration of this situation, the image generating device 1 (in detail, the display switching part 28) of this embodiment may perform the following control so that the traveling route display data 43d is displayed only when needed. Moreover, below, a case where the image generating device 1 is set so as to calculate the distances from the three kinds of virtual reality objects (the setting route, the water depth setting, and the traveling prohibited area) illustrated in FIG. 8 is assumed and described.

First, the display switching part 28 may acquire the distance A from the setting route 42 to the ship 4 or the traveling route 43 (S101). Next, the display switching part 28 may acquire the distance B from the water depth setting to the ship 4 or the traveling route 43 (S102). Next, the display switching part 28 may acquire the distance C from the traveling prohibited area to the ship 4 or the traveling route 43 (S103).

Next, the display switching part 28 may determine, for the acquired three distances, whether at least any one of [the distance A≥a threshold α], [the distance B≤a threshold β], and [the distance C≤a threshold γ] is satisfied (S104). Here, the distance A may be desirable to be a smaller value because it indicates the positional offset from the setting route 42. On the other hand, the distance B and the distance C may be desirable to be larger values because they are the distances from the positions where approaching to these positions are wanted to be avoided. Therefore, by performing the determination, the urgency of whether to move the position of the ship 4 immediately at the present moment may be determined.

If Yes at Step S104 (i.e., when it is urgent because the positional offset from the setting route 42 is large, or approaching to the position to be avoided), the display switching part 28 may display the traveling route display data 43d (S105). In addition, if Yes at Step S104, the warning part 29 may perform the warning in the manner described above. Further, the display switching part 28 may display the traveling route display data 43d in the display mode according to the difference from the threshold. For example, the traveling route display data 43d may be displayed in the display mode in which a degree of urgency is discriminable as the distance A becomes larger from the threshold α and the distance B (the distance C) becomes smaller from the threshold β (the threshold γ). In detail, the degree of urgency can be grasped by the user, by making the color darker, making the color close to aposematic coloration, such as yellow or red, or making the indication blinking.

On the other hand, if No at Step S104 (i.e., when the urgency is low), the display switching part 28 may make the traveling route display data 43d "NOT DISPLAY" (S106). Note that, since the processing of FIG. 9 is performed periodically, DISPLAY/NOT DISPLAY of the traveling route display data 43d may be changed automatically according to the urgency.

Note that, in this embodiment, the degree of urgency may be determined based on all of the three distances. However, if a measurement of one distance is set, the degree of urgency may be determined only based on the one distance. Moreover, even if measurements of a plurality of distances are set, the change between DISPLAY/NOT DISPLAY of the traveling route display data 43d, and the change in the display mode according to the urgency may be performed only based on a distance with a higher priority.

Next, a change in the synthesized image accompanying the shake of the ship 4 is described briefly. As described above, since the camera 3 is attached to the ship 4, its position and direction may change in connection with the attitude of the ship 4 inclining by a wave etc. or the ship 4 running up onto a wave. In this embodiment, the data synthesizing part 25 may change the position and the direction of the camera 3 in the three-dimensional virtual space 40 so that, when the shake (pitching, rolling, and heaving) occurred in the ship 4, it simulates the change in the attitude of the ship 4 acquired by the attitude acquiring part 16, and the change in the vertical position of the ship 4 acquired by the position acquiring part 15, and change the position of the projection screen 51 accordingly.

In detail, in the viewpoint following mode, the rendering of the three-dimensional scene data 48 by the data synthesizing part 25 may be updated each time the pitch angle or the roll angle changes more than a given value, and each time the height of the ship 4 changes more than a given value due to the shake of the ship 4, and the display data 41d, 42d, and 43d based on the latest viewpoint may be generated. Therefore, the indication of the display data 41d, 42d, and 43d can be changed appropriately so that the state where they are placed on the sea surface is maintained, against the captured image of the camera 3 in which the position and the direction at which the sea surface appears changes due to the shakes of the ship 4. Therefore, the imaginary objects may be viewed as if they are floating on the sea surface. Thus, since a comparison between the position indicated by the setting route 42 and the position indicated by the traveling route 43 becomes easier, the offset from the setting route 42 can be grasped intuitively.

As described above, the image generating device 1 of this embodiment may include the attitude acquiring part 16, the traveling route acquiring part 17*a*, the traveling route display data generating part 22*b*, and the data synthesizing part 25, and perform the following method of generating the image. The attitude acquiring part 16 may acquire the attitude information indicative of the attitude the camera 3 or the ship 4 where the camera 3 is installed. The traveling route acquiring part 17*a* may acquire the traveling route 43 of the ship 4 based on the detection result of at least one of the position and the direction of the ship 4. The traveling route display data generating part 22*b* may generate the traveling route display data 43*d* based on the attitude information and the traveling route 43. The data synthesizing part 25 may generate the synthesized image in which the traveling route display data 43*d* is synthesized with the image outputted from the camera 3.

Therefore, since the surrounding image and the traveling route 43 of the ship 4 are displayed in the synthesized image, the traveling route 43 can be grasped intuitively.

Moreover, the image generating device 1 of this embodiment may be provided with the distance acquiring part 17*b* which acquires the distance from the given reference position (the reference point, the reference line, or the reference area) to the ship 4 or the traveling route 43.

Therefore, the state of progress of the ship 4 compared with the reference position, such as the reference point, the reference line, or the reference area can be grasped.

Moreover, the image generating device 1 of this embodiment may be provided with the distance display data generating part 23 which generates the distance display data 44*d* based on the distance acquired by the distance acquiring part 17*b*. The data synthesizing part 25 may generate the synthesized image in which the distance display data 44*d* is further synthesized at the position associated with the traveling route 43.

Therefore, the distance to the given reference position can be grasped concretely.

Moreover, the image generating device 1 of this embodiment may be provided with the display switching part 28 which changes between DISPLAY and NOT DISPLAY of the traveling route display data 43*d* according to the distance acquired by the distance acquiring part 17*b*.

Therefore, while preventing that the image becomes complicated when the indication of the traveling route display data 43*d* is unnecessary, the traveling route display data 43*d* can be displayed automatically when needed.

Moreover, in the image generating device 1 of this embodiment, the distance acquiring part 17*b* may acquire the distance from the point which is on the traveling route 43 and is ahead of the position of the ship 4 by the given length, to the reference position.

Therefore, since the ship cannot change the course suddenly, the value with higher validity can be acquired by acquiring the distance at the point slightly ahead.

Moreover, the image generating device 1 of this embodiment may be provided with the directional difference acquiring part 17*c* which acquires the difference in the traveling direction between the setting route 42 set by the user and the traveling route 43.

Therefore, since the difference in the traveling direction may be more important than the distance to the setting route 42 depending on the situation (e.g., when the setting route 42 is straight over a long distance), the information more useful for the user can be acquired.

Moreover, the image generating device 1 of this embodiment may be provided with the setting route display data generating part 22*a* which generates the setting route display data 42*d* based on the setting route 42 set by the user and the attitude information. The data synthesizing part 25 may generate the synthesized image in which the setting route display data 42*d* is further synthesized.

Therefore, since both the setting route display data 42*d* and the traveling route display data 43*d* are displayed, the offset of the traveling route 43 from the setting route 42 can be grasped intuitively.

Although the suitable embodiment of the present disclosure is described above, the above configuration may be changed as follows, for example.

In the camera 3, the pan/tilt function may be omitted, and the imaging direction may be fixed to forward, for example. In this case, the synthesized image can be generated only by acquiring the attitude of the ship 4, without acquiring the attitude of the camera 3. Moreover, the camera 3 may be disposed so as to image a direction other than the forward (e.g., rearward).

The camera 3 may image the circumference of the ship 4 simultaneously covering all directions of 360°. Moreover, when the user performs an operation for changing the point of view of the synthesized image, the pan/tilt operation of the camera 3 may be automatically performed so as to follow the change in the point of view.

Upon the three-dimensional scene generating part 22 generating the three-dimensional scene data 48, the virtual reality objects 41*v*, 42*v*, and 43*v* may be placed on the basis of the bow in which the position of the ship 4 is used as the origin in the above embodiment, as illustrated in FIG. 5. However, the virtual reality objects 41*v*, 42*v*, and 43*v* may be placed not on the basis of the bow but on the basis of north in which the +z direction is always north. In this case, when the bow direction of the ship 4 changes by turning etc., the direction of the ship 4 in the three-dimensional virtual space 40 is changed in the yaw direction, instead of replacing the virtual reality objects 41*v*, 42*v*, and 43*v*. Then, while simulating the change in the position and the direction of the camera 3 in the three-dimensional virtual space 40 at this time, the position and the direction of the viewpoint camera 55 are changed in an interlocked manner with the change in the position and the direction of the camera 3 and performing the rendering, thereby obtaining the completely same rendering result as the case of the bow basis.

Moreover, in the coordinate system of the three-dimensional virtual space 40, a fixed point which is suitably defined on the earth is used as the origin instead of the position of the ship 4 being used as the origin, and, for example, the +z direction may be north and the +x direction may be east. In this case, in the three-dimensional virtual space 40 of the coordinate system fixed to the earth, the position and the direction at which the ship 4 is located may change based on the positional information and the attitude information, and the change in the position and the direction of the camera 3 accompanying this may be simulated in the three-dimensional virtual space 40.

In the image generating device 1, processing for reducing the shakes of the synthesized image accompanying the shakes of the ship 4 may be performed. For example, the three-dimensional scene generating part 22 may reduce the change in the position and the direction of the viewpoint camera 55, even if the ship 4 shakes.

The display data 41d, 42d, and 43d (figures which constitute a part of the synthesized image) outputted from the data synthesizing part 25 may be somethings thin and two-dimensional which are pasted to the water surface, or may be somethings three-dimensional which project from the water surface by certain height(s).

The imaging position setting part 26 may set the position of the camera 3 in the ship 4 as a relative position to the GNSS antenna.

The ship apparatuses (information sources of the additional display information) connected to the image generating device 1 are not limited to what illustrated in FIG. 1, and they may include other ship apparatuses.

The present disclosure is applicable not only to the ship which travels on the sea but also applicable to arbitrary water-surface movable bodies which are capable of traveling, for example, the sea, a lake, or a river.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Unless otherwise noted, numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. An image generating device, comprising:
processing circuitry configured to:
acquire attitude information, which is indicative of an attitude of an imaging device or a water-surface movable body where the imaging device is installed, from an attitude sensor of the water-surface movable body, wherein the attitude information includes a direction of the water-surface movable body;
acquire a position of the imaging device or water-surface movable body from a GNSS receiver of the water-surface movable body;
acquire a traveling route of the water-surface movable body based on at least one of the acquired position and the acquired direction of the water-surface movable body;
generate traveling route display data based on the attitude information and the traveling route;
generate a synthesized image in which the traveling route display data is synthesized with an image outputted from the imaging device; and
output the synthesized image to a display.

2. The image generating device of claim 1, wherein the processing circuitry is further configured to acquire a distance from a given reference position to the water-surface movable body or the traveling route.

3. The image generating device of claim 2, wherein the reference position is a reference point, a reference line, or a reference area.

4. The image generating device of claim 3, wherein the processing circuitry is further configured to:
generate distance display data based on the distance, and
generate the synthesized image in which the distance display data is further synthesized at a position associated with the traveling route.

5. The image generating device of claim 3, wherein the processing circuitry is further configured to change the traveling route display data between a state where the traveling route display data is displayed and not displayed according to the distance.

6. The image generating device of claim 1, wherein the processing circuitry is further configured to acquire a distance from a point on the traveling route to the reference position, the point being located ahead of the position of the water-surface movable body by a given length.

7. The image generating device of claim 1, wherein the processing circuitry is further configured to acquire a difference in a traveling direction between a setting route set by a user and the traveling route.

8. The image generating device of claim 1, wherein the processing circuitry is further configured to:
generate setting route display data based on the setting route set by the user and the attitude information, and
generate the synthesized image in which the setting route display data is further synthesized.

9. The image generating device of claim 8, wherein a length of the traveling route display data in the traveling direction included in the synthesized image is shorter than a length of the setting route display data in the traveling direction included in the synthesized image.

10. The image generating device of claim 8, wherein the processing circuitry is further configured to generate the synthesized image in which a route offset from the setting route is rendered as the traveling route display data.

11. The image generating device of claim 1, wherein the processing circuitry is further configured to generate the synthesized image in which the traveling route display data that is an extension of a bow direction of the water-surface movable body or a traveling direction calculated based on a traveling trace of the water-surface movable body is rendered.

12. The image generating device of claim 1, wherein the processing circuitry is further configured to acquire the attitude information based on an image captured by the imaging device.

13. The image generating device of claim 1, wherein the attitude sensor is a GNSS sensor.

14. The image generating device of claim 2, wherein the processing circuitry is further configured to perform a warning when the distance exceeds a given threshold.

15. A method of generating an image, comprising:
acquiring attitude information, which is indicative of an attitude of an imaging device or a water-surface movable body where the imaging device is installed, from an attitude sensor of the water-surface movable body, wherein the attitude information includes a direction of the water-surface movable body;
acquiring a position of the imaging device or water-surface movable body from a GNSS receiver of the water-surface movable body;
acquiring a traveling route of the water-surface movable body based on at least one of the acquired position and the acquired direction of the water-surface movable body;
generating traveling route display data based on the attitude information and the traveling route;
generating a synthesized image in which the traveling route display data is synthesized with an image outputted from the imaging device; and
outputting the synthesized image to a display.

16. The image generating device of claim 2, wherein the processing circuitry is further configured to acquire a distance from a point on the traveling route to the reference position, the point being located ahead of the position of the water-surface movable body by a given length.

17. The image generating device of claim 3, wherein the processing circuitry is further configured to acquire a distance from a point on the traveling route to the reference position, the point being located ahead of the position of the water-surface movable body by a given length.

18. The image generating device of claim 4, wherein the processing circuitry is further configured to acquire a distance from a point on the traveling route to the reference position, the point being located ahead of the position of the water-surface movable body by a given length.

19. The image generating device of claim 5, wherein the processing circuitry is further configured to acquire a distance from a point on the traveling route to the reference position, the point being located ahead of the position of the water-surface movable body by a given length.

20. A non-transitory computer-readable recording medium storing a control program causing a processor of an image generating device to execute processing, the processor configured to control operation of the device, the processing comprising:

acquiring attitude information, which is indicative of an attitude of an imaging device or a water-surface movable body where the imaging device is installed, from an attitude sensor of the water-surface movable body, wherein the attitude information includes a direction of the water-surface movable body;

acquiring a position of the imaging device or water-surface movable body from a GNSS receiver of the water-surface movable body;

acquiring a traveling route of the water-surface movable body based on at least one of the acquired position and the acquired direction of the water-surface movable body;

generating traveling route display data based on the attitude information and the traveling route;

generating a synthesized image in which the traveling route display data is synthesized with an image outputted from the imaging device; and outputting the synthesized image to a display.

* * * * *